(12) United States Patent
Choi et al.

(10) Patent No.: US 11,637,846 B2
(45) Date of Patent: Apr. 25, 2023

(54) METHOD AND DEVICE FOR SECURING NETWORK

(71) Applicant: Daegu Gyeongbuk Institute of Science and Technology, Daegu (KR)

(72) Inventors: Ji Woong Choi, Daegu (KR); Eun Min Choi, Gyeongsangnam-do (KR); Sung Min Han, Daejeon (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 312 days.

(21) Appl. No.: 16/836,369

(22) Filed: Mar. 31, 2020

(65) Prior Publication Data

US 2020/0228564 A1 Jul. 16, 2020

Related U.S. Application Data

(63) Continuation of application No. PCT/KR2018/001431, filed on Feb. 2, 2018.

(30) Foreign Application Priority Data

Oct. 19, 2017 (KR) .......................... 10-2017-0136048

(51) Int. Cl.
*H04L 9/40* (2022.01)

(52) U.S. Cl.
CPC ...... *H04L 63/1425* (2013.01); *H04L 63/0227* (2013.01); *H04L 63/1416* (2013.01); *H04L 63/1433* (2013.01); *H04L 63/1441* (2013.01)

(58) Field of Classification Search
CPC ............. H04L 63/1433; H04L 63/0227; H04L 63/1416; H04L 63/1441; H04L 63/1425;
(Continued)

(56) References Cited

U.S. PATENT DOCUMENTS 10,124,764 B1 * 11/2018 Ahmed ................ B60R 16/023
2008/0140795 A1   6/2008 He et al.
(Continued)

FOREIGN PATENT DOCUMENTS

| KR | 10-2010-0083681 | 7/2010 |
| KR | 10-2014-0006408 | 1/2014 |
| KR | 10-1621019 | 5/2016 |

OTHER PUBLICATIONS

Gmiden, Mabrouka; Gmiden, Mohamed Hedi; Trabelsi, Hafedh; "An intrusion detection method for securing in-vehicle CAN bus," 2016 17th International Conference on Sciences and Techniques of Automatic Control and Computer Engineering (STA), Sousse, Tunisia, 2016, pp. 176-180, doi: 10.1109/STA.2016.7952095.*
(Continued)

*Primary Examiner* — Victor Lesniewski
(74) *Attorney, Agent, or Firm* — Hauptman Ham, LLP

(57) ABSTRACT

A method, performed by an observer node, of securing a network, includes: receiving a signal over the network; determining, based on a frequency characteristic of the received signal, which is determined according to a physical characteristic of a node, which transmits the received signal, a node, which has transmitted the received signal among a plurality of nodes included in the network; comparing a pre-learned signal pattern of the determined transmission node with a pattern of the received signal to determine whether the determined transmission node is a malicious node; and blocking the signal transmitted from the malicious node by determining that the transmission node is a malicious node.

8 Claims, 7 Drawing Sheets

(58) Field of Classification Search
CPC .. H04L 63/0876; H04L 12/40; H04W 12/122; H04W 12/79
See application file for complete search history.

(56) References Cited

U.S. PATENT DOCUMENTS

| | | | | |
|---|---|---|---|---|
| 2010/0283849 | A1* | 11/2010 | Stephanson | G01N 29/14 |
| | | | | 348/143 |
| 2012/0290261 | A1* | 11/2012 | Genta | G05B 23/00 |
| | | | | 702/179 |
| 2013/0051248 | A1 | 2/2013 | Pei et al. | |
| 2013/0227648 | A1* | 8/2013 | Ricci | H04W 12/088 |
| | | | | 726/3 |
| 2016/0081101 | A1* | 3/2016 | Yu | H04W 4/80 |
| | | | | 370/329 |
| 2016/0337386 | A1* | 5/2016 | Ford | H04L 63/1466 |
| 2016/0219067 | A1 | 7/2016 | Han et al. | |
| 2016/0226892 | A1 | 8/2016 | Sen et al. | |
| 2016/0352768 | A1 | 12/2016 | Lefebvre et al. | |
| 2016/0381068 | A1* | 12/2016 | Galula | G07C 5/0816 |
| | | | | 726/23 |
| 2017/0153282 | A1 | 6/2017 | Du et al. | |
| 2017/0318044 | A1* | 11/2017 | Dagmi | H04L 43/10 |
| 2018/0115575 | A1* | 4/2018 | Hartkopp | H04L 63/1425 |
| 2018/0316700 | A1* | 11/2018 | Maluf | H04L 12/66 |
| 2018/0337938 | A1* | 11/2018 | Kneib | H04W 4/48 |
| 2019/0021004 | A1* | 1/2019 | Shanmugavadivel | |
| | | | | H04W 12/08 |
| 2019/0028500 | A1* | 1/2019 | Lee | H04L 12/40032 |
| 2019/0052653 | A1* | 2/2019 | Galula | B60R 16/02 |
| 2019/0116157 | A1* | 4/2019 | Kishikawa | H04L 12/28 |
| 2019/0245872 | A1* | 8/2019 | Shin | H04L 12/40 |
| 2019/0385057 | A1* | 12/2019 | Litichever | H04L 63/14 |

OTHER PUBLICATIONS

Song, Hyun Min; Kim, Ha Rang; Kim, Huy Kang; "Intrusion detection system based on the analysis of time intervals of CAN messages for in-vehicle network," 2016 International Conference on Information Networking (ICOIN), Kota Kinabalu, Malaysia, 2016, pp. 63-68, doi: 10.1109/ICOIN.2016.7427089.*
Notice of Allowance for KR 9-5-2019-060027416, dated Aug. 20, 2019, 2 pp.
Rejection Decision for KR 9-5-2019-051559775, dated Jul. 17, 2019, 3 pp.
Office Action for KR 9-5-2019-004170109, dated Jan. 17, 2019, 6 pp.

* cited by examiner

FIG. 4

| 410 | 1 | 2 | 3 | 4 | 5 | 6 | 7 | 8 | 9 |
|---|---|---|---|---|---|---|---|---|---|
| 420 | 0.29 | 0.28 | 0.23 | 0.14 | 0.26 | 0.13 | 0.23 | 0.19 | 0.27 |
| 430 | 0.96 / 1.76 | 2.48 | 1.23 | 2.58 | 2.44 | 2.50 | 1.85 | 0.99 | 3.21 |

METHOD AND DEVICE FOR SECURING NETWORK

CROSS-REFERENCE TO RELATED APPLICATION

The present application claims benefit as a Continuation of PCT application number PCT/KR2018/001431 filed Feb. 2, 2018, with priority to Korean Patent Application No. 10-2017-0136048, filed on Oct. 19, 2017, each of which is incorporated herein in its entirety by reference.

TECHNICAL FIELD

The present disclosure relates to a method and a device for enhancing security of a network in a physical layer.

BACKGROUND

Along with emphasizing the importance of network security, various schemes of enhancing security in a higher layer have been proposed.

For example, as an encryption scheme, a scheme of permitting communication over a network only to an authorized user by using a public key and a private key is proposed.

However, when a malicious user can perceive a relation between a public key and a private key, the malicious user can easily control, such as read or modify, a document since the malicious user can generate the private key based on a transmitted public key, and thus, security may be compromised once the relation between the public key and the private key is leaked out.

In addition, to detect and control a malicious node through encryption and authentication procedures in a higher layer, a process of determining whether a node is a malicious node by receiving a signal from a physical layer, converting the received signal into data, decoding the data, and performing an authentication on the decoded data is necessary, and thus, a time delay occurs and complexity increases.

DESCRIPTION OF EMBODIMENTS

Technical Problem

Provided are a method and a device for enhancing security of a network in a physical layer.

Technical problems to be solved in the present embodiments are not limited to the technical problems described above, and other technical problems may be inferred from the embodiments below.

Solution to Problem

The present disclosure relates to a method and a device for securing a network, and more particularly, provides a security method using a physical characteristic of a signal in a physical layer.

Advantageous Effects of Disclosure

A quick and enhanced security method may be provided by using a physical characteristic of a signal in a physical layer.

BRIEF DESCRIPTION OF DRAWINGS

FIG. 4 illustrates a plurality of nodes and a CAN bus according to an embodiment.

BRIEF DESCRIPTION

Figure 1:
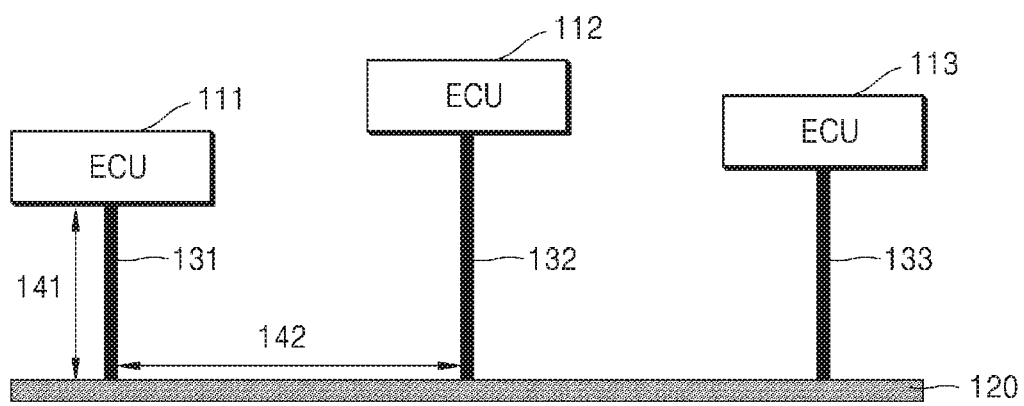
FIG. 1 illustrates a controller area network (CAN) according to an embodiment.

According to an aspect, there is provided a method, performed by an observer node, of securing a network, the method including: receiving a signal over the network; determining, based on a frequency characteristic of the received signal, which is determined according to a physical characteristic of a node, which transmits the received signal, a node, which has transmitted the received signal among a plurality of nodes included in the network; comparing a pre-learned signal pattern of the determined transmission node with a pattern of the received signal to determine whether the determined transmission node is a malicious node; and blocking the signal transmitted from the malicious node by determining that the transmission node is a malicious node.

According to another aspect, there is provided a security device for securing a network, the security device including: a communication unit configured to receive a signal over the network; and a processor, wherein the processor is configured to determine, based on a frequency characteristic of the received signal, which is determined according to a physical characteristic of a node, which transmits the received signal, a node, which has transmitted the received signal among a plurality of nodes included in the network, compare a pre-learned signal pattern of the determined transmission node with a pattern of the received signal to determine whether the determined transmission node is a malicious node, and block the signal transmitted from the malicious node by determining that the transmission node is a malicious node, and the security device is one of the plurality of nodes included in the network.

According to another aspect, there is provided a method, performed by an observer node, of securing a network, the method including: receiving a signal over the network; determining a node corresponding to a pattern of the received signal based on the pattern of the received signal and pre-learned signal patterns of nodes constituting the network; determining a node corresponding to a frequency characteristic of the received signal, which is determined according to a physical characteristic of a node, which has transmitted the received signal, based on the frequency characteristic of the received signal; comparing the determined node corresponding to the pattern of received signal with the determined node corresponding to the frequency characteristic of the received signal to determine whether the determined node corresponding to the frequency characteristic of the received signal is a malicious node; and blocking a signal transmitted from the malicious node by determining that a transmission node is a malicious node.

DETAILED DESCRIPTION

Hereinafter, embodiments only for illustration will be described in detail with reference to the accompanying drawings. The embodiments below are only to embody the technical idea but do not restrict or delimit a right scope. It is analyzed that the matters which could be readily inferred by those of ordinary skill in the art from the detailed description and the embodiments belong to the right scope.

It should not be analyzed that the term such as "consist of" or "include" used in the present specification necessarily includes all of a plurality of components or a plurality of steps described in the specification, and it should be analyzed that some components or steps thereof may not be included, or additional components or steps may be further included. In addition, terms such as " . . . unit" and "module" refer to units that perform at least one function or operation, and the units may be implemented as hardware or software or as a combination of hardware and software.

In addition, although terms including ordinal numbers, such as "first" and "second", used in the present specification can be used to describe various elements, the terms can be used to classify a certain element from another element or used for the purpose of convenience of description.

Hereinafter, the embodiments are described in detail with reference to the drawings.

FIG. 1 illustrates a controller area network (CAN) according to an embodiment.

Referring to FIG. 1, the CAN may include a bus 120 through which a signal is transmitted and a plurality of electronic control units (ECUs).

According to a CAN scheme, the bus 120 may include two paired wirings CAN_High and CAN_Low. In this case, communication is performed through a signal of a form of a voltage difference between the two wirings. A plurality of nodes may be formed on the CAN bus 120. In this case, the plurality of nodes respectively correspond to the plurality of ECUs connected to the CAN bus 120. The plurality of ECUs connected in parallel to the CAN bus 120 may transmit and receive a signal to each other through the CAN bus 120.

According to the CAN scheme, a signal may be transmitted and received in a broadcasting manner. That is, a signal transmitted from any one of the plurality of nodes may be received by the other nodes, and a control unit corresponding to each of the plurality of the other nodes which have received the signal determines whether the received signal is a signal to be processed, based on identification information of a message included in the received signal.

For example, a signal transmitted from a first node 111 among the plurality of nodes may be received by not only a second node 112 but also a third node 113. When a message included in the signal transmitted from the first node is a type supposed to be processed by the second node, the second node may check that the message included in the signal is a message supposed to be processed by the second node, based on identification information of the message included in the received signal. However, the third node may determine that the received signal is not processed, based on the identification information of the message included in the received signal.

Each of the plurality of nodes may include a tap having a predetermined length 141. The lengths of the taps 131, 132, 133 of the plurality of nodes may not be identical. Alternatively, the lengths of the taps of at least some of the plurality of nodes may be different from the lengths of the taps of the other nodes.

In addition, a distance 142 between two adjacent nodes among the plurality of nodes may be previously determined. In this case, the distances between two adjacent nodes may not be identical.

In addition, distances between two adjacent nodes among the plurality of nodes may be previously determined. In this case, the distances between two adjacent nodes may not be identical.

A physical characteristic of each of the plurality of nodes may be determined based on an arrangement structure of the plurality of nodes, the number of nodes, the length of a tap of each of the plurality of nodes, and distances between the plurality of nodes but is not limited thereto.

Figure 2:
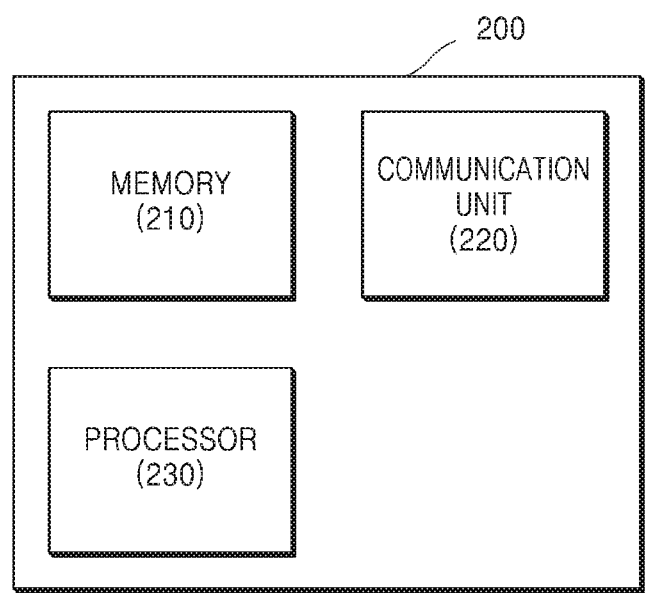
FIG. 2 is a block diagram of an observer node according to an embodiment.

FIG. 2 is a block diagram of an observer node 200 according to an embodiment.

The observer node 200 may include a memory 210, a communication unit 220, and a processor 230. FIG. 2 shows only mandatory components related to an embodiment of the present disclosure. It could be understood by those of ordinary skill in the art that the observer node 200 may further include general-purpose components.

The observer node 200 may receive, through the communication unit 220, a signal transmitted through a CAN bus. The communication unit 220 of the observer node 200 may receive all signals transmitted from the other nodes through the CAN bus, by using a CAN interface.

The observer node 200 may include the memory 210. For example, the observer node 200 may store, in the memory 210, data included in a received signal.

The processor 230 may determine a node which has transmitted a received signal, based on a frequency characteristic determined according to a physical characteristic of the node which has transmitted the received signal.

The processor 230 may obtain the frequency characteristic by analyzing the received signal.

For example, the processor 230 may obtain the intensity of a signal for each frequency component of the received signal.

The processor 230 may previously learn a frequency characteristic of a signal transmitted from each of a plurality of nodes. A frequency characteristic of a signal may be determined according to a physical characteristic of signal transmission node. Alternatively, a frequency characteristic of a signal may be determined according to the signal transmitted from a signal transmission node. Alternatively, a frequency characteristic of a signal may be determined according to the number of nodes connected to the CAN bus, a distance between adjacent nodes among a plurality of nodes, the length of a tap corresponding to each of the plurality of nodes, and an arrangement structure of the plurality of nodes. In addition, a physical characteristic may be relatively determined in a relationship with the observer node 200, and physical characteristics of the other nodes may vary depending on a position of the observer node 200. For example, when the observer node 200 is changed, relative positions between the observer node 200 and nodes which transmit a signal, and thus, physical characteristics of the nodes which transmit a signal may vary.

The processor 230 may determine, as a node which has transmitted a received signal, a node having a physical characteristic corresponding to a frequency characteristic of the received signal. For example, the processor 230 may compare a frequency characteristic obtained from the received signal with a pre-learned frequency characteristic of each of a plurality of nodes to determine the node, which has transmitted the received signal.

The processor 230 may obtain a frequency characteristic by analyzing the received signal. For example, the processor 230 may obtain a signal magnitude for each frequency component of the received signal.

The processor 230 may pre-learn a frequency characteristic of a signal transmitted from each of the plurality of nodes and received by the processor 230. A frequency characteristic of a signal may be determined according to a physical characteristic of a node, which transmits the signal. In addition, a frequency characteristic of a signal may be determined according to a transmission signal of a node, which transmits the signal. As described above, a frequency characteristic of a signal may be determined according to the number of nodes connected to a controller area network (CAN) bus, a distance between adjacent nodes among the plurality of nodes, a length of a tap corresponding to each of the plurality of nodes, and an arrangement structure of the plurality of nodes. In addition, a physical characteristic may vary according to a position of an observer node 200 among the plurality of nodes. For example, when the observer node 200 is changed, relative positions between the processor 230 and nodes, which transmit a signal, are changed, and thus, a physical characteristic of a node, which has transmitted a signal, may be changed.

The processor 230 may pre-learn a reference frequency or a reference frequency band. Herein, the reference frequency or the reference frequency band is a frequency or a frequency band at which the plurality of nodes are identified within a predetermined identification failure probability limitation because frequency characteristics of the plurality of nodes differ from each other in a corresponding frequency or reference frequency band.

In addition, the processor 230 may pre-learn a frequency characteristic transmitted from each of the plurality of nodes and received by the processor 230 in the reference frequency or the reference frequency band.

A plurality of reference frequencies may be used. For example, at least one node identified in the plurality of reference frequencies may be different.

The processor 230 may compare each of pre-learned frequency characteristics respectively corresponding to the plurality of nodes except for the observer node 200 with the obtained frequency characteristic of the received signal to determine a node, which has transmitted the received signal. For example, the processor 230 may compare a pre-learned frequency characteristic corresponding to each of the plurality of nodes in the reference frequency or the reference frequency band with the frequency characteristic of the received signal to determine a node, which has transmitted the received signal.

The processor 230 may determine, as a transmission node, a node having the most similar frequency characteristic to the frequency characteristic of the received signal in the reference frequency or the reference frequency band among the pre-learned frequency characteristics respectively corresponding to the plurality of nodes in the reference frequency or the reference frequency band.

For example, a difference between each of the pre-learned frequency characteristics respectively corresponding to the plurality of nodes and the frequency characteristic of the received signal, i.e., a frequency-specific signal magnitude difference, is calculated, and a node corresponding to a frequency characteristic of which the calculated difference is within a predetermined range may be determined as the transmission node.

When a plurality of nodes have a frequency characteristic of which the calculated difference is within a predetermined range, the processor 230 may update or add a reference frequency or a reference frequency band for distinguishing the plurality of nodes. As described above, the processor 230 may continuously learn frequency characteristics of nodes based on the identification result, thereby increasing the accuracy of identification.

The processor 230 may determine, as the node, which has transmitted the received signal, a node having a physical characteristic corresponding to the frequency characteristic of the received signal. For example, the processor 230 may compare the frequency characteristic obtained from the received signal with a pre-learned frequency characteristic of each of the plurality of nodes to determine the node, which has transmitted the received signal.

A plurality of observer nodes 200 may exist. There may be different probabilities that processors in the plurality of observer nodes 200 identify a plurality of different nodes based on frequency characteristics of received signals, respectively. For example, a first observer node among the plurality of observer nodes 200 may have a higher probability of identifying a first node to be identified among nodes to be identified than a second observer node, and the second observer node may have a higher probability of identifying a second node to be identified among the nodes to be identified than the first observer node. In this case, the processor of the first observer node may be used to identify the first node to be identified, and the processor of the second observer node may be used to identify the second node to be identified.

In addition, the transmission node may be determined by weighting an identification result of each of the plurality of processors based on the identification accuracy of each of the plurality of processors.

The processor 230 may compare a pre-learned signal characteristic of the determined transmission node with the characteristic of the received signal to determine whether the determined transmission node is a malicious node.

For example, the processor 230 may compare a pre-learned signal pattern of the determined transmission node with a pattern of the received signal to determine whether the determined transmission node is a malicious node.

Because each of the plurality of nodes performs a limited function, a pattern of a signal transmitted from each node may be limited. For example, identification information of a message included in a signal transmitted from each node may be limited. For example, a signal including identification information of a message related to control of an engine may be transmitted from nodes corresponding to an engine control unit (ECU) related to the engine.

Therefore, the processor 230 may learn a pattern of a signal including identification information of a message related to an operation or control of the engine, by using a signal patter of a node corresponding to the ECU corresponding to the engine.

As described above, the processor 230 may learn a signal pattern including identification information of a message for performing a specific operation or control, by using a signal pattern of a node corresponding to an ECU configured to perform the specific operation or control.

As another example, the processor 230 may learn a pattern of a signal including a series of data sequence transmitted for a predetermined time to perform a specific operation or control, by using a signal pattern of a node corresponding to an ECU configured to perform the specific operation or control.

The processor 230 may determine whether the node, which has transmitted the received signal, is a malicious node, based on the pre-learned signal pattern of the determined transmission node and the pattern of the received signal.

The processor 230 may determine that the transmission node is a malicious node when the pre-learned signal pattern of the transmission node does not match the signal pattern of the received signal.

For example, the processor 230 may reduce a reliability value of the transmission node when the pre-learned signal pattern of the transmission node does not match the pattern of the received signal. When the pre-learned signal pattern of the transmission node, which has been determined based on the frequency characteristic of the received signal, does not match the pattern of the received signal, the reliability of the transmission node may be reduced. The reliability of a node may be a quantitative index for determining whether the node is a malicious node.

The processor 230 may determine that the determined transmission node is a malicious node when the reliability value of the determined transmission node is a predetermined threshold or less. For example, the processor 230 may store identification of a malicious node, such as position information of a node determined as the malicious node, in data.

For example, an initial reliability value of a node corresponding to an ECU related to an engine may be 1. The processor 230 may determine that the node, which has transmitted the received signal, is a node corresponding to an ECU related to an engine, based on the received frequency characteristic. The processor 230 may determine whether a pre-learned signal pattern of the node corresponding to the ECU related to the engine matches the pattern of the received signal. The processor 230 may obtain a reliability value of the node corresponding to the ECU related to the engine, which is stored in a memory 210. When both the signal patterns do not match, the reliability value may be reduced.

According to an embodiment, the processor 230 may pre-learn a signal pattern matched with and transmitted from each of all nodes and received by the processor 230. The signal pattern is matched with the signal pattern described above.

The processor 230 may determine a node having a signal pattern corresponding to the signal pattern of the received signal, based on the pre-learned signal pattern.

The processor 230 may pre-learn a physical characteristic for all nodes. For example, the processor 230 may be matched with each of all the nodes and pre-learn the frequency characteristic of the received signal, which is determined according to a physical characteristic of a node, which transmits the received signal.

The processor 230 may compare a node determined according to the frequency characteristic of the received signal, which is determined according to a physical characteristic of a node, which transmits the received signal, with a node determined based on the pattern of the received signal to determine whether the node determined according to the frequency characteristic of the received signal is a malicious node.

As another example, the processor 230 may determine whether a node determined according to the frequency characteristic of the received signal is a malicious node, based on the frequency characteristic of the received signal, which is determined according to a physical characteristic of a node, which transmits the received signal, and a pre-learned frequency characteristic of the node determined based on the pattern of the received signal.

For example, the processor 230 may determine that the node determined according to the frequency characteristic, which is the transmission node, is a malicious node when the node determined according to the frequency characteristic of the received signal does not match the node determined according to the pattern of the received signal.

As another example, the processor 230 may determine that the node determined according to the frequency characteristic of the received signal is a malicious node when the frequency characteristic of the received signal, which is determined according to a physical characteristic of a node, which transmits the received signal, does not match the pre-learned frequency characteristic of the node determined based on the pattern of the received signal.

In addition, when the pattern of the received signal does not correspond to all pre-learned signal patterns of all the nodes, the processor 230 may determine that the node determined according to the frequency characteristic of the received signal is a malicious node. When the frequency characteristic of the received signal does not correspond to pre-learned frequency characteristics of all the nodes, the processor 230 may determine that a malicious node is added.

According to a signal, when a reliability value of a transmission node is a predetermined threshold or less, it may be determined that the transmission node is a malicious node.

For example, when an obtained reliability value of a node corresponding to an ECU related to an engine is 0.6, the processor 230 may determine that patterns of both signals do not match, reduce a reliability value by 0.1, update the obtained reliability value of the node corresponding to the ECU related to the engine to 0.5, and store the updated reliability value in the memory 210. In addition, when the predetermined threshold is 0.5, the processor 230 may determine that the node corresponding to the ECU related to the engine is a malicious node.

The processor 230 may block communication with the malicious node as soon as the processor 230 determines that the transmission node is a malicious node. For example, the processor 230 may be configured to transmit a jamming signal through the CAN bus to disturb signal transmission of a node determined as a malicious node.

For example, the processor 230 may disturb signal transmission of the malicious node by transmitting a jamming signal in response to a signal transmitted through the CAN bus while the malicious node is transmitting the signal.

For example, the processor 230 may disturb signal transmission of the malicious node by transmitting a physical signal through the CAN bus as a dominant signal. The physical signal may be a predetermined voltage signal. For example, the processor 230 may transmit a signal of a high potential through the CAN bus as a dominant signal such that the malicious node cannot transmit a signal.

The processor 230 may continuously transmit the dominant signal through the CAN bus, or as another example, the processor 230 may transmit a jamming signal only when a node determined as a malicious node transmits a signal.

As described above, when the frequency characteristic of the received signal does not correspond to the pre-learned frequency characteristics of all the nodes, the processor 230 may determine that a malicious node is added. In this case, the processor 230 may continuously transmit a jamming signal.

In addition, for example, the processor 230 may transmit, through the CAN bus, a signal including identification information of the malicious node. The plurality of nodes may store the identification information of the malicious node, which is included in the received signal, in respective memories of the plurality of nodes. In addition, the plurality of nodes may compare identification information of a node, which has transmitted a received signal, with the identification information of the malicious node, and stop processing of the received signal when the identification information of the node, which has transmitted the received signal, matches the identification information of the malicious node.

Figure 3:
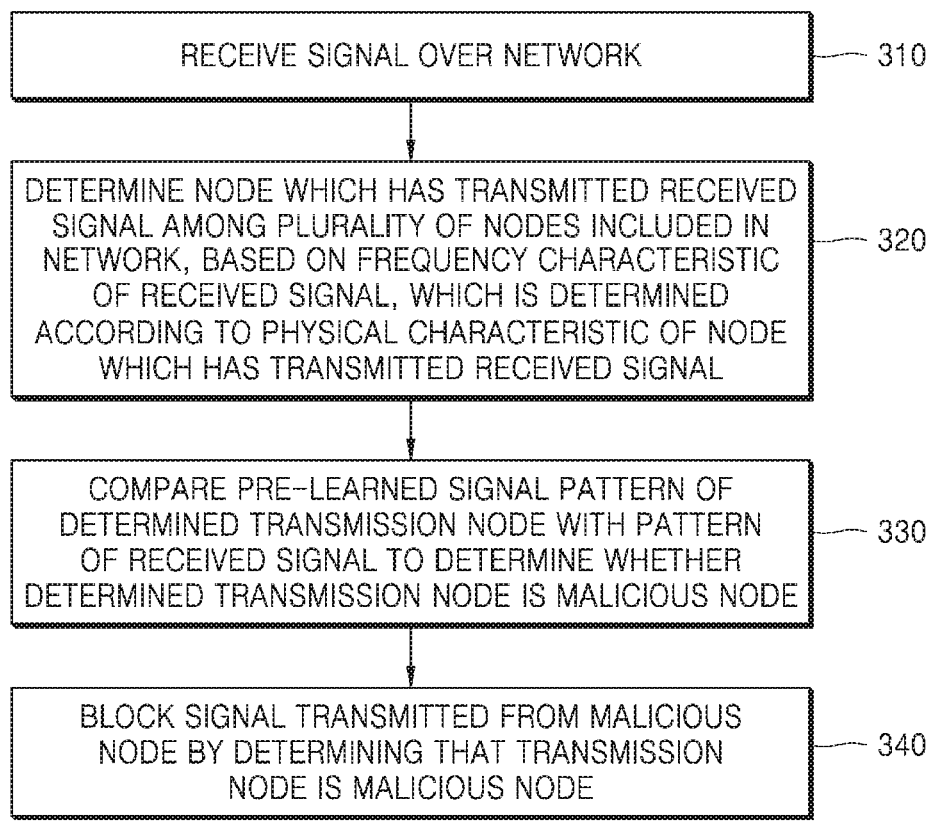
FIG. 3 is a flowchart of a method, performed by an observer node, of securing a network, according to an embodiment.

FIG. 3 is a flowchart of a method, performed by the observer node 200, of securing a network, according to an embodiment.

In operation 310, the observer node 200 may receive a signal over the network.

For example, the observer node 200 may receive signal transmitted from each of a plurality of nodes connected to a CAN bus. As described above, in a CAN network, a signal may be transmitted and received through the CAN bus according to a broadcasting manner. That is, a signal transmitted from any one of the plurality of nodes may be received by all the other nodes including the observer node 200.

In operation 320, the observer node 200 may determine a node, which has transmitted the received signal, based on a frequency characteristic of the received signal, which is determined according to a physical characteristic of a node, which transmits the received signal.

The observer node 200 may obtain a frequency characteristic by analyzing the received signal. For example, the observer node 200 may obtain frequency component-specific signal magnitudes of the received signal.

The observer node 200 may pre-learn a frequency characteristic of a signal transmitted from each of the plurality of nodes and received by the observer node 200. The frequency characteristic of the signal may be determined according to a physical characteristic of a node, which transmits the signal. Alternatively, the frequency characteristic of the signal may be determined according to a transmission signal of a node, which transmits the signal. As described above, the frequency characteristic of the signal may be determined according to the number of nodes connected to the CAN bus, a distance between adjacent nodes among the plurality of nodes, a length of a tap corresponding to each of the plurality of nodes, and an arrangement structure of the plurality of nodes. In addition, a physical characteristic may vary according to a position of the observer node 200 among the plurality of nodes. For example, when the observer node 200 is changed, relative positions between the processor 230 and nodes, which transmit a signal, are changed, and thus, a physical characteristic of a node, which has transmitted a signal, may be changed.

The observer node 200 may pre-learn a reference frequency or a reference frequency band. Herein, the reference frequency or the reference frequency band is a frequency or a frequency band at which the plurality of nodes are identified within a predetermined identification failure probability limitation because frequency characteristics of the plurality of nodes differ from each other in a corresponding frequency or reference frequency band.

In addition, the observer node 200 may pre-learn a frequency characteristic transmitted from each of the plurality of nodes and received by the observer node 200 in the reference frequency or the reference frequency band.

A plurality of reference frequencies may be used. For example, at least one node identified in the plurality of reference frequencies may be different.

The observer node 200 may compare each of pre-learned frequency characteristics respectively corresponding to the plurality of nodes except for the observer node 200 with the obtained frequency characteristic of the received signal to determine a node, which has transmitted the received signal. For example, the observer node 200 may compare a pre-learned frequency characteristic corresponding to each of the plurality of nodes in the reference frequency or the reference frequency band with the frequency characteristic of the received signal to determine a node, which has transmitted the received signal.

The observer node 200 may determine, as a transmission node, a node having the most similar frequency characteristic to the frequency characteristic of the received signal in the reference frequency or the reference frequency band among the pre-learned frequency characteristics respectively corresponding to the plurality of nodes in the reference frequency or the reference frequency band.

For example, a difference between each of the pre-learned frequency characteristics respectively corresponding to the plurality of nodes and the frequency characteristic of the received signal, i.e., a frequency-specific signal magnitude difference, is calculated, and a node corresponding to a frequency characteristic of which the calculated difference is within a predetermined range may be determined as the transmission node.

When a plurality of nodes have a frequency characteristic of which the calculated difference is within a predetermined range, the observer node 200 may update or add a reference frequency or a reference frequency band for distinguishing the plurality of nodes. As described above, the observer node 200 may continuously learn frequency characteristics of nodes based on the identification result, thereby increasing the accuracy of identification.

The observer node 200 may determine, as the node, which has transmitted the received signal, a node having a physical characteristic corresponding to the frequency characteristic of the received signal. For example, the observer node 200 may compare the frequency characteristic obtained from the received signal with a pre-learned frequency characteristic of each of the plurality of nodes to determine the node, which has transmitted the received signal.

A plurality of observer nodes 200 may exist. There may be different probabilities that processors in the plurality of observer nodes 200 identify a plurality of different nodes based on frequency characteristics of received signals, respectively. For example, a first observer node among the plurality of observer nodes 200 may have a higher probability of identifying a first node to be identified among nodes to be identified than a second observer node, and the second observer node may have a higher probability of identifying a second node to be identified among the nodes to be identified than the first observer node. In this case, the first observer node 200 may be used to identify the first node to be identified, and the second observer node may be used to identify the second node to be identified.

In addition, the transmission node may be determined by weighting an identification result of each of the plurality of observer nodes based on the identification accuracy of each of the plurality of observer nodes.

In operation 330, the observer node 200 may compare a pre-learned signal pattern of the determined transmission node with a pattern of the received signal to determine whether the determined transmission node is a malicious node.

The observer node 200 may compare the pre-learned signal pattern of the determined transmission node with the pattern of the received signal to determine whether the determined transmission node is a malicious node.

Because each of the plurality of nodes performs a limited function, a pattern of a signal transmitted from each node may be limited.

For example, identification information of a message included in a signal transmitted from each node may be limited. For example, a signal including identification information of a message related to control of an engine may be transmitted from nodes corresponding to an ECU related to the engine.

Therefore, the observer node 200 may learn a pattern of a signal including identification information of a message related to an operation or control of the engine, by using a signal patter of a node corresponding to the ECU corresponding to the engine.

As described above, the observer node 200 may learn a signal pattern including identification information of a message for performing a specific operation or control, by using a signal pattern of a node corresponding to an ECU configured to perform the specific operation or control.

As another example, the observer node 200 may learn a pattern of a signal including a series of data sequence transmitted for a predetermined time to perform a specific operation or control, by using a signal pattern of a node corresponding to an ECU configured to perform the specific operation or control.

As another example, the observer node 200 may learn a voltage patter of signals transmitted in a voltage signal form for a predetermined time to perform a specific operation or control, by using a signal pattern of a node corresponding to an ECU configured to perform the specific operation or control. Each ECU may have a voltage value or a signal pattern defined by a change aspect of the voltage value for a specific time period of a transmission signal. In this case, each ECU may have a plurality of patterns of a transmission signal. Therefore, the observer node 200 may learn a plurality of voltage signal patterns by using a signal patter of a node corresponding to each ECU, which performs a specific operation or control.

The observer node 200 may determine the node, which has transmitted the received signal, based on a frequency characteristic of the received signal. In this case, it may be determined whether the node, which has transmitted the received signal, is a malicious node, based on a pre-learned signal pattern of the determined node and a data pattern of the received signal.

The observer node 200 may determine that the transmission node is a malicious node when the pre-learned signal pattern of the transmission node does not match the signal pattern of the received signal.

For example, the observer node 200 may reduce a reliability value of the transmission node when the pre-learned signal pattern of the transmission node does not match a data pattern of the received signal. When the pre-learned data pattern of the transmission node, which has been determined based on the frequency characteristic of the received signal, does not match the data pattern of the received signal, the reliability of the transmission node may be reduced by a predetermined value. The reliability of a node may be a quantitative index for determining whether the node is a malicious node.

According to an embodiment, the observer node 200 may pre-learn a signal pattern matched with and transmitted from each of all nodes and received by the observer node 200. The signal pattern is matched with the signal pattern described above.

The observer node 200 may determine a node having a signal pattern corresponding to the signal pattern of the received signal, based on the pre-learned signal pattern.

The observer node 200 may pre-learn a physical characteristic for all nodes. For example, the observer node 200 may be matched with each of all the nodes and pre-learn the frequency characteristic of the received signal, which is determined according to a physical characteristic of a node, which transmits the received signal.

The observer node 200 may compare a node determined according to the frequency characteristic of the received signal, which is determined according to a physical characteristic of a node, which transmits the received signal, with a node determined based on the patter of the received signal to determine whether the node determined according to the frequency characteristic of the received signal is a malicious node.

As another example, the observer node 200 may determine whether a node determined according to the frequency characteristic of the received signal is a malicious node, based on the frequency characteristic of the received signal, which is determined according to a physical characteristic of a node, which transmits the received signal, and a pre-learned frequency characteristic of the node determined based on the pattern of the received signal.

For example, the observer node 200 may determine that the node determined according to the frequency characteristic, which is the transmission node, is a malicious node when the node determined according to the frequency characteristic of the received signal does not match the node determined according to the pattern of the received signal.

As another example, the observer node 200 may determine that the node determined according to the frequency characteristic of the received signal is a malicious node when the frequency characteristic of the received signal, which is determined according to a physical characteristic of a node, which transmits the received signal, does not match the pre-learned frequency characteristic of the node determined based on the pattern of the received signal.

In addition, when the pattern of the received signal does not correspond to all pre-learned signal patterns of all the nodes, the observer node 200 may determine that the node determined according to the frequency characteristic of the received signal is a malicious node. When the frequency characteristic of the received signal does not correspond to pre-learned frequency characteristics of all the nodes, the observer node 200 may determine that a malicious node is added.

The observer node 200 may determine that the determined transmission node is a malicious node when the reliability value of the determined transmission node is a predetermined threshold or less. For example, the observer node 200 may store identification of a malicious node, such as position information of a node determined as the malicious node, in data.

For example, an initial reliability value of a node corresponding to an ECU related to an engine may be 1. The observer node 200 may determine that the node, which has transmitted the received signal, is a node corresponding to an ECU related to an engine, based on the received frequency characteristic. The observer node 200 may determine whether a pre-learned signal pattern of the node corresponding to the ECU related to the engine matches the pattern of the received signal. The observer node 200 may obtain a reliability value of the node corresponding to the ECU related to the engine, which is stored in the memory 210. When both the signal patterns do not match, the reliability value may be reduced.

According to a signal, when a reliability value of a transmission node is a predetermined threshold or less, it may be determined that the transmission node is a malicious node.

In operation 340, the observer node 200 may determine that the transmission node is a malicious node, and block a signal transmitted from the malicious node.

For example, the observer node 200 may be configured to transmit a jamming signal through the CAN bus to disturb signal transmission of a node determined as a malicious node.

For example, the observer node 200 may disturb signal transmission of the malicious node by transmitting a jamming signal in response to a signal transmitted through the CAN bus while the malicious node is transmitting the signal.

For example, the observer node 200 may disturb signal transmission of the malicious node by transmitting a physical signal through the CAN bus as a dominant signal. The physical signal may be a predetermined voltage signal. For example, the observer node 200 may transmit a signal of a high potential through the CAN bus as a dominant signal such that the malicious node cannot transmit a signal.

The observer node 200 may continuously transmit the dominant signal through the CAN bus, or as another example, the observer node 200 may transmit a jamming signal only when a node determined as a malicious node transmits a signal.

As described above, when the frequency characteristic of the received signal does not correspond to the pre-learned frequency characteristics of all the nodes, the observer node 200 may determine that a malicious node is added. In this case, the observer node 200 may continuously transmit a jamming signal. In addition, for example, the observer node 200 may transmit, through the CAN bus, a signal including identification information of the malicious node. The plurality of nodes may store the identification information of the malicious node, which is included in the received signal, in respective memories 210 of the plurality of nodes. In addition, the plurality of nodes may compare identification information of a node which has transmitted a received signal with the identification information of the malicious node, and stop processing of the received signal when the identification information of the node, which has transmitted the received signal, matches the identification information of the malicious node.

FIG. 4 illustrates a plurality of nodes and a CAN bus according to an embodiment.

Figure 5:
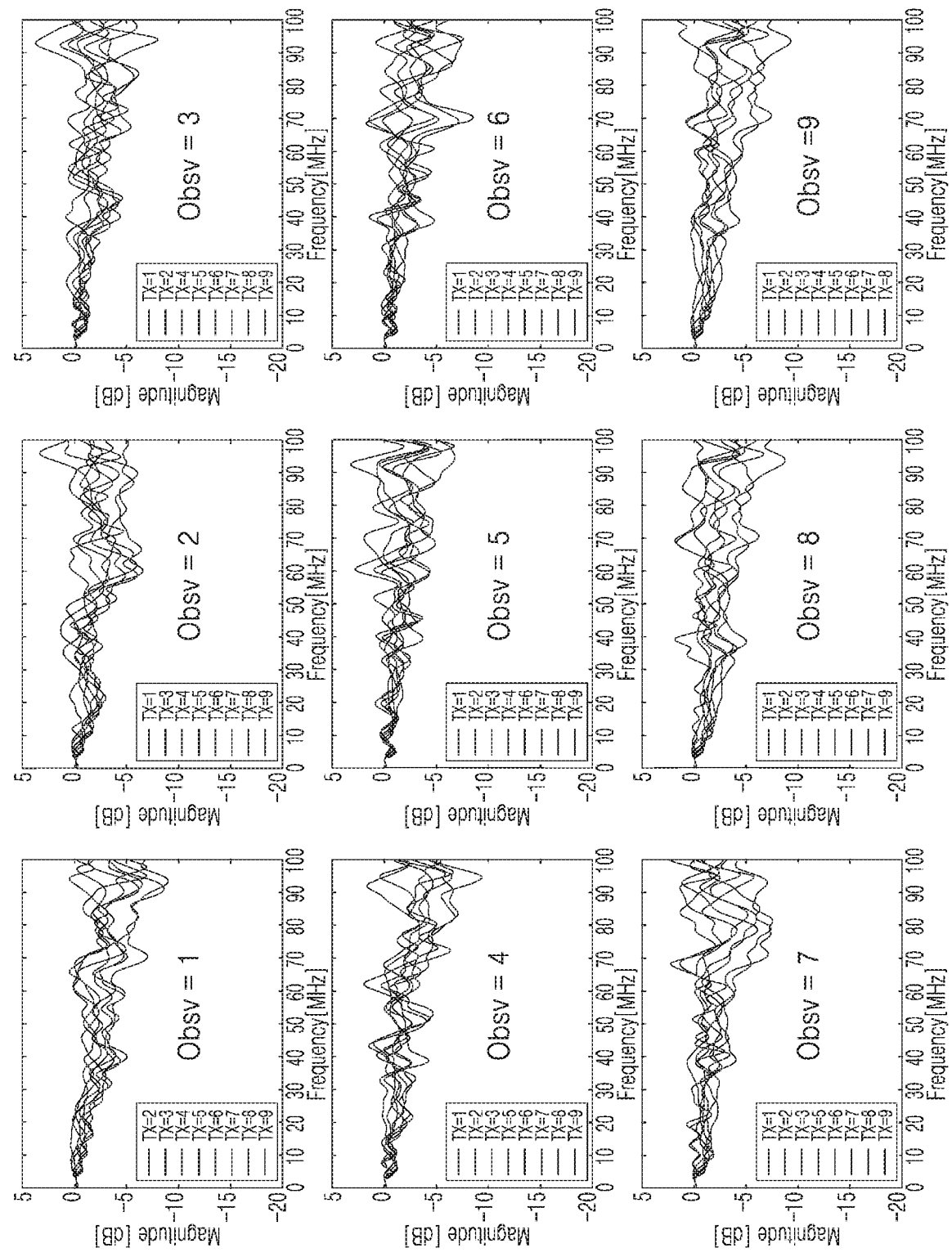
FIG. 5 shows graphs, in a frequency domain, of physical characteristics of nodes detected by an observer node.
Figure 6:
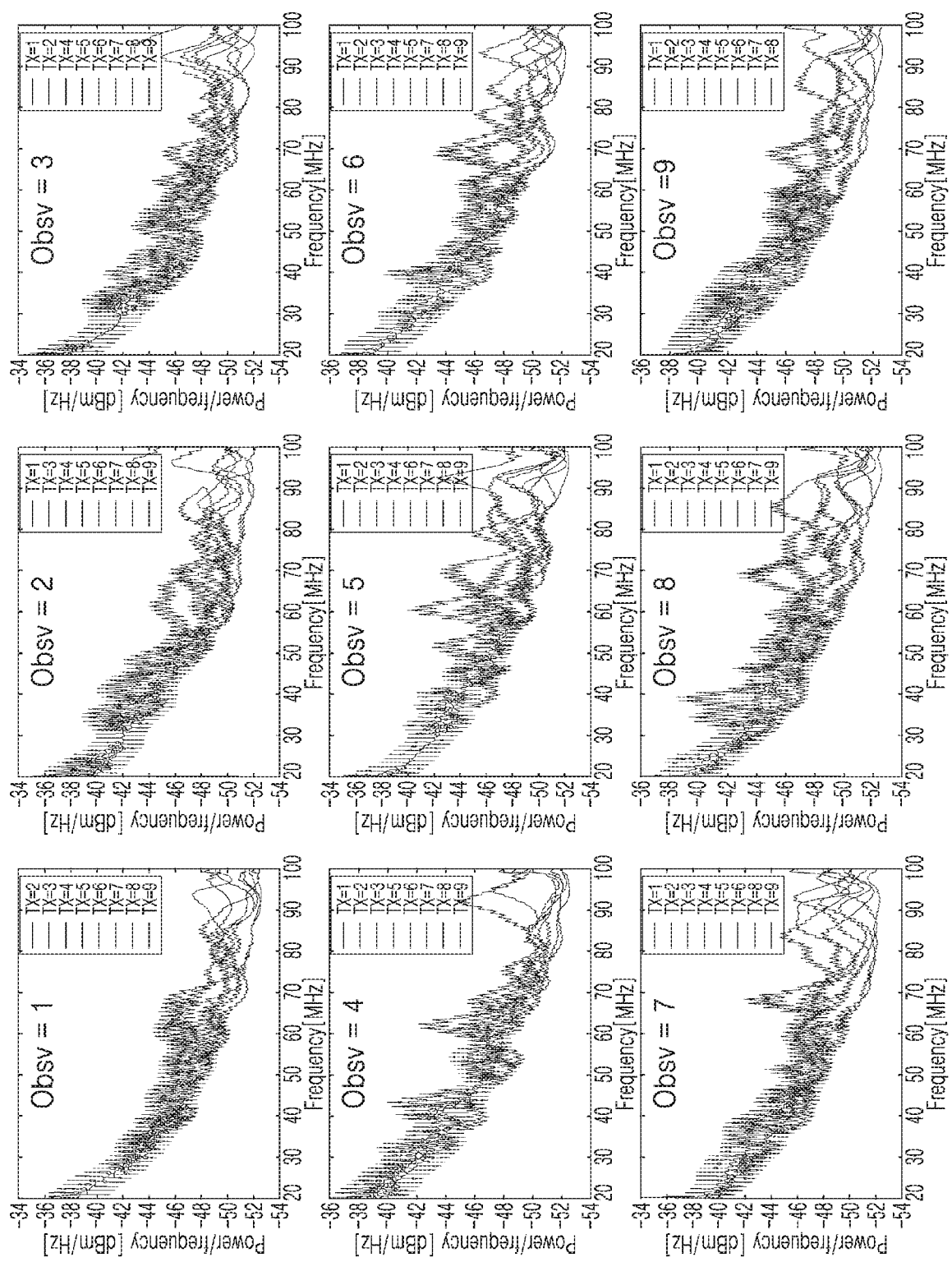
FIG. 6 shows graphs, in the frequency domain, of signals transmitted from other nodes and received by an observer node.
Figure 7:
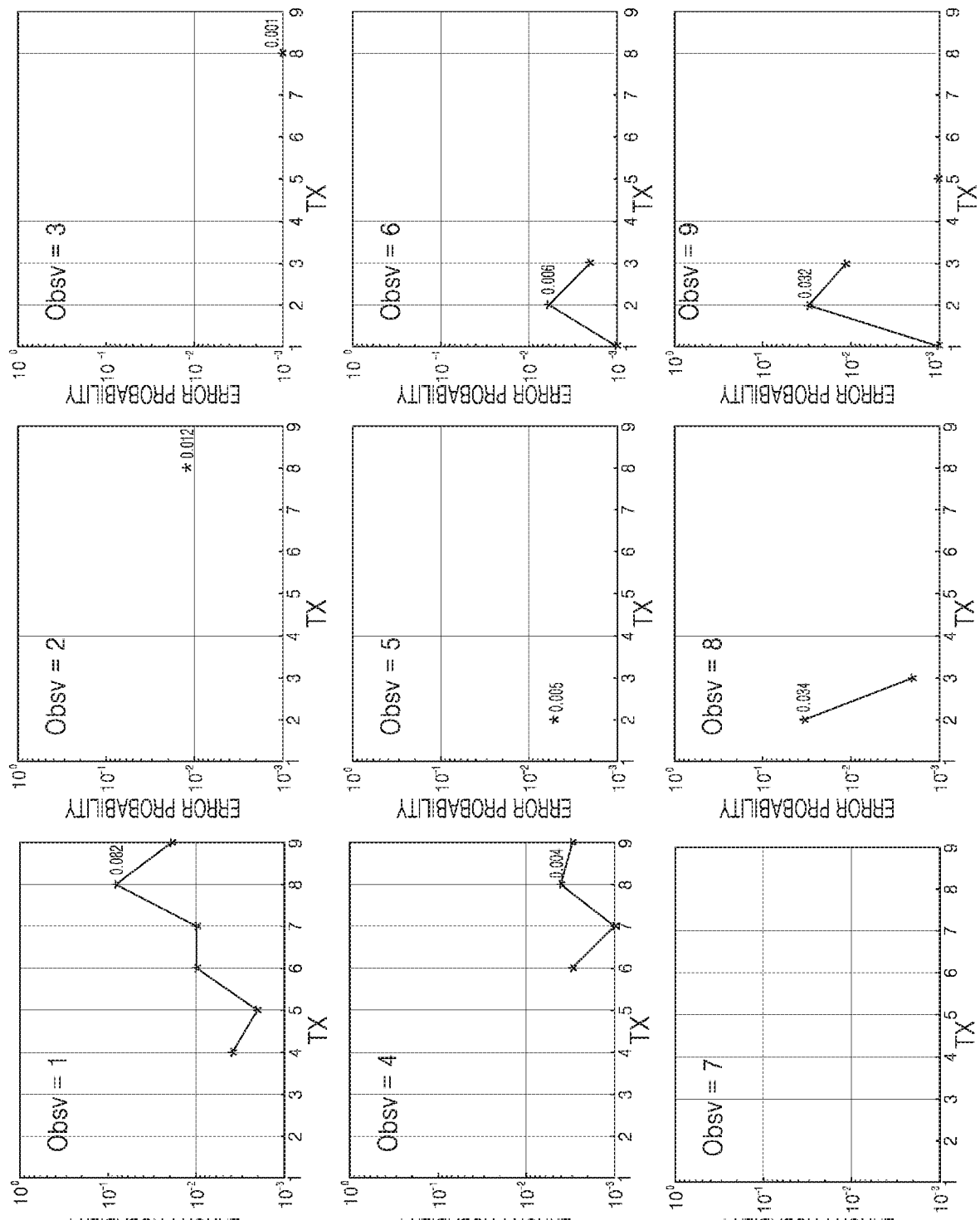
FIG. 7 shows graphs of error probabilities of identification by an observer node.

In addition, FIGS. 5 to 7 illustrate results of simulations performed using the CAN bus shown in FIG. 4.

FIG. 4 shows an example in which a CAN including nine nodes.

Each number marked in a chain line region 410 is an index allocated to each of the nine nodes for convenience of description. Hereinafter, a node marked with 1 may be named node 1, a node marked with 2 may be named node 2, and the others are named in this manner.

Each numerical value indicated in a chain line region 420 is a length of a tap corresponding to each node and has a meter unit. In the CAN bus to be simulated which is shown in FIG. 4, a length of a tap of node 1 is 0.29 m, and a length of a tap of node 7 is 0.23 m.

Each numerical value indicated in a chain line region 430 is a distance between adjacent nodes and has a meter unit. In the CAN bus to be simulated, which is shown in FIG. 4, a distance between node 1 and node 2 is 1.76 m and a distance between node 6 and node 7 is 2.50 m.

Hereinafter, FIGS. 5 and 6 show results of simulations performed using the CAN bus of FIG. 4 for a total of nine cases in which one of node 1 to node 9 is an observer node.

FIG. 5 shows graphs, in a frequency domain, of physical characteristics of nodes detected by an observer node.

The horizontal axis of each of the graphs shown in FIG. 5 indicates frequency of a MHz unit, and the vertical axis indicates the magnitude of a signal indicating a physical characteristic and has a decibel (dB) unit.

Obsv denotes a number of a node corresponding to the observer node. For example, a graph of which Obsv is 1 is a graph in which physical characteristics of the other nodes 2 to 9 in the frequency domain when the observer node is node 1. Therefore, nine graphs corresponding to a total of nine cases in which the observer node is node 1 to node 9 are shown.

In addition, in each graph, TX denotes respective node numbers of nodes to be observed as indices of nodes other than the observer node.

For example, in a first graph, a line corresponding to TX=8 indicates a physical characteristic of node 8 observed by node 1 when the observer node is node 1.

Even for the same node, a physical characteristic thereof vanes according to an observer node. This is because the physical characteristic is a relative characteristic defined based on an observer node.

FIG. 5 shows graphs, in the frequency domain, of only physical characteristics of nodes to be observed regardless of a transmitted signal.

Referring to the graphs of FIG. 5, frequency characteristics corresponding to physical characteristics of nodes to be observed are relatively better distinguished in a high frequency band than in a low frequency band. This indicates that there is a possibility that a transmission node may be determined by analyzing a frequency characteristic of a received signal, which is determined based on a physical characteristic of the transmission node.

FIG. 6 shows graphs, in the frequency domain, of signals transmitted from other nodes and received by an observer node.

The observer node identifies a node to be observed, based on a physical characteristic of the node to be observed and a received signal determined according to a signal transmitted from the node to be observed.

The horizontal axis of each of the graphs shown in FIG. 6 indicates frequency of a MHz unit, and the vertical axis indicates the magnitude of power per frequency of a signal transmitted from each of the other nodes and received by the observer node and has a dBm/Hz unit.

Like FIG. 5, Obsv denotes a number of a node corresponding to the observer node. For example, a graph of which Obsv is 1 is a graph in which signals transmitted from the other nodes 2 to 9 and received by node 1 are analyzed in the frequency domain when the observer node is node 1.

In addition, in each graph, TX denotes respective indices of transmission nodes, i.e., nodes to be observed, which transmit a signal, other than the observer node.

For example, in a first graph, a line corresponding to TX=8 indicates a signal in the frequency domain, transmitted from node 8 and received by node 1 that is the observer node.

In addition, a transmission signal is set as a baseband rectangular signal transmitted at a speed of 1 Mbps.

Referring to the first graph in which the observer node is node 1, in a low frequency band, magnitudes of signals transmitted from the other nodes 2 to 9 and received are not clearly distinguished. However, in a high frequency band, e.g., a frequency band adjacent to 90 MHz, magnitudes of received signals are clearly distinguished.

Referring to the graphs of FIG. 6, the identification performances of the other nodes may vary according to an observer node. For example, the greater a magnitude difference between signals transmitted from the other nodes and received by the observer node in the same frequency band is, the more the identification performance increases.

In addition, the observer node may determine a reference frequency or a reference frequency band at which magnitudes of signals transmitted from a plurality of nodes and received by the observer node are distinguished. The observer node may identify a transmission node based on a magnitude of a signal received at the reference frequency or the reference frequency band.

There may be a plurality of reference frequencies or reference frequency bands. In this case, nodes respectively identified at the plurality of reference frequencies or reference frequency bands may differ from each other.

For example, the observer node may determine a plurality of reference frequencies or reference frequency bands for distinguishing a plurality of nodes. For example, when the observer node is 3, a corresponding third graph is referred to, node 1 is clearly distinguished from other nodes, e.g., node 2 and node 3, at 90 MHz. Therefore, the observer node may determine, as 90 MHz, a reference frequency for distinguishing node 1 from the other nodes. However, at 90 MHz, a magnitude difference between signals transmitted from node 5 and node 8 and received by the observer node is relatively small, and thus, it may be difficult to distinguish node 5 from node 8. In this case, because a magnitude difference between signals transmitted from node 5 and node 8 and received by the observer node is relatively great at 100 MHz, the observer node may determine, as 100 MHz, a reference frequency for distinguishing node 5 from node 8. As described above, there may be a plurality of reference frequencies.

In addition, the observer node may determine a reference frequency band for distinguishing a plurality of nodes. For example, when the observer node is 3, the observer node may determine the reference frequency band as 90 MHz to 100 MHz. Accordingly, each of the plurality of nodes may be identified based on a frequency characteristic of a signal transmitted from each of the plurality of nodes and received by the observer node.

FIG. 7 shows graphs of error probabilities of identification by an observer node.

Like FIGS. 5 and 6, Obsv denotes an index of the observer node.

The horizontal axis of a plurality of graphs indicates index TX of nodes to be identified, and the vertical axis indicates an error probability at which a node to be identified is not identified.

For example, referring to a first graph, when the observer node is 1, an error probability at which node 8 is not identified based on a received signal is 0.082 and is the greatest, and error probabilities at which node 2 and node 3 are not identified are 0, and thus, node 2 and node 3 are identified at an accuracy of 100%, and nodes may be identified at a very high accuracy.

In addition, when the observer node is 7, error probabilities corresponding to all nodes are 0, and thus, all the nodes are identified at an accuracy of 100%.

Therefore, because the observer node may most accurately identify the other nodes when the observer node is 7, node 7 may be designed as the observer node.

In addition, there may be a plurality of observer nodes. When two nodes, node 1 and node 8, are observer nodes, node 1 may identify node 2 and node 3 having an accuracy of 100%, and node 8 may identify nodes 4 to 7 and node 9 having an accuracy of 100%. Therefore, a plurality of nodes may complementarily identify transmission nodes. In addition, the plurality of nodes may mutually determine whether another node is a malicious node. For example, when observer nodes are node 3 and node 5, node 3 may determine whether node 5 is a malicious node, and node 5 may determine whether node 3 is a malicious node, thereby enhancing security.

In the present application, it may be determined that a processor should be widely analyzed to include a general-purpose processor, a central processing unit (CPU), a microprocessor, a digital signal processor (DSP), a controller, a microcontroller, a state machine, and the like. In several environments, "processor" may indicate an application-specific integrated circuit (ASIC), a programmable logic device (PLD), a field programmable gate array (FPGA), or the like. The term "processor" may indicate a set of processing devices, such as a set of a DSP and a microprocessor, a set of a plurality of microprocessors, a set of one or more microprocessors coupled to a DSP core, or other random similar configurations.

The above description of the present invention is only illustrative, and it will be understood by those of ordinary skill in the art to which the present invention belongs that various changes in form and details may be made therein without changing the technical spirit and mandatory features of the present invention. Therefore, the embodiments described above should be understood in the illustrative sense only and not for the purpose of limitation in all aspects. For example, each component described as a single type may be carried out by being distributed, and likewise, components described as a distributed type may also be carried out by being coupled.

The scope of the present invention is defined not by the detailed description but by the appended claims, and all changed or modified forms derived from the meaning and the scope of the claims and the equivalent concepts thereof will be construed as being included in the present invention.

We claim:

1. A method, performed by an observer node, of securing a network, the method comprising:
   receiving a signal over the network;
   determining a transmission node, which has transmitted the received signal among a plurality of nodes included in the network, by comparing a frequency characteristic of the received signal with a predetermined frequency characteristic of each node of the plurality of nodes, wherein the predetermined frequency characteristic is pre-determined based on a physical characteristic between the observer node and the each node over the network;
   determining whether the determined transmission node is a malicious node by comparing a signal pattern of the received signal with a pre-learned signal pattern of the determined transmission node, wherein the pre-learned signal pattern includes identification information of a signal transmitted from a predetermined node among the plurality of nodes; and when the determined transmission node is determined as the malicious node, blocking the signal transmitted from the malicious node, wherein the predetermined frequency characteristic of each node is the magnitude of each signal transmitted from the each node to the observer node, wherein a difference between each of the pre-learned frequency characteristics respectively corresponding to the plurality of nodes and the frequency characteristic of the received signal, a frequency-specific signal magnitude difference, is calculated, and a node corresponding to a frequency characteristic of which the calculated difference is within a predetermined range is determined as the transmission node, and wherein when a plurality of nodes have a frequency characteristic of which the calculated difference is within a predetermined range, the observer node update or add a reference frequency or a reference frequency band for distinguishing the plurality of nodes.

2. The method of claim 1, wherein the physical characteristic includes distances between the observer node and the plurality of nodes and lengths of taps respectively corresponding to the plurality of nodes over the network.

3. The method of claim 1, further comprising:
determining whether the determined transmission node is a malicious node by comparing the frequency characteristic of the received signal with a predetermined frequency characteristic of each node of the plurality of nodes.

4. The method of claim 1, wherein the determining whether the determined transmission node is a malicious node comprises:
reducing a reliability value of the determined transmission node when the pre-learned signal pattern of the determined transmission node does not match the signal pattern of the received signal; and
determining that the determined transmission node is a malicious node when the reduced reliability value of the transmission node is equal to a threshold value or less, the threshold value being a malicious node determination reference.

5. The method of claim 1,
wherein the predetermined frequency characteristic of each node is a temporal change pattern the magnitude of each signal transmitted from the each node to the observer node.

6. The method of claim 1, wherein the observer node includes a plurality of observer nodes.

7. A security device for securing a network, the security device comprising:
a communication unit configured to receive a signal over the network; and
a processor,
wherein the processor is configured to
determine a transmission node, which has transmitted the received signal among a plurality of nodes included in the network, by comparing a frequency characteristic of the received signal with a predetermined frequency characteristic of each node of the plurality of nodes, wherein the predetermined frequency characteristic is pre-determined based on a physical characteristic between the observer node and the each node over the network;
determine whether the determined transmission node is a malicious node by comparing a signal pattern of the received signal with a pre-learned signal pattern of the determined transmission node, wherein the pre-learned signal pattern includes identification information of a signal transmitted from a predetermined node among the plurality of nodes; and
when the determined transmission node is determined as the malicious node, block the signal transmitted from the malicious node, wherein the predetermined frequency characteristic of each node is the magnitude of each signal transmitted from the each node to the observer node, wherein the security device is one of the plurality of nodes included in the network, wherein a difference between each of the pre-learned frequency characteristics respectively corresponding to the plurality of nodes and the frequency characteristic of the received signal, a frequency-specific signal magnitude difference, is calculated, and a node corresponding to a frequency characteristic of which the calculated difference is within a predetermined range is determined as the transmission node, and wherein when a plurality of nodes have a frequency characteristic of which the calculated difference is within a predetermined range, the observer node update or add a reference frequency or a reference frequency band for distinguishing the plurality of nodes.

8. A method, performed by an observer node, of securing a network, the method comprising:
receiving a signal over the network;
determining a transmission node, which has transmitted the received signal among a plurality of nodes included in the network, by comparing a signal pattern of the received signal with a pre-learned signal pattern of the determined transmission node, wherein the pre-learned signal pattern includes identification information of a signal transmitted from a predetermined node among the plurality of nodes;
determining whether the determined transmission node is a malicious node by comparing a frequency characteristic of the received signal with a predetermined frequency characteristic of each node of the plurality of nodes, wherein the predetermined frequency characteristic is pre-determined based on a physical characteristic between the observer node and the each node over the network;
when the determined transmission node is determined as the malicious node, blocking the signal transmitted from the malicious node, wherein the predetermined frequency characteristic of each node is the magnitude of each signal transmitted from the each node to the observer node, wherein a difference between each of the pre-learned frequency characteristics respectively corresponding to the plurality of nodes and the frequency characteristic of the received signal, a frequency-specific signal magnitude difference, is calculated, and a node corresponding to a frequency characteristic of which the calculated difference is within a predetermined range is determined as the transmission node, and wherein when a plurality of nodes have a frequency characteristic of which the calculated difference is within a predetermined range, the observer node update or add a reference frequency or a reference frequency band for distinguishing the plurality of nodes.

* * * * *